July 14, 1953        B. M. BROWN        2,645,049
METHOD OF ORNAMENTING ARTICLES
Filed Jan. 27, 1951
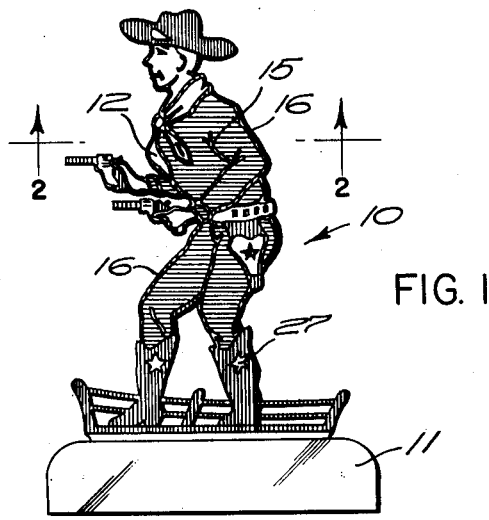
FIG. 1
FIG. 2
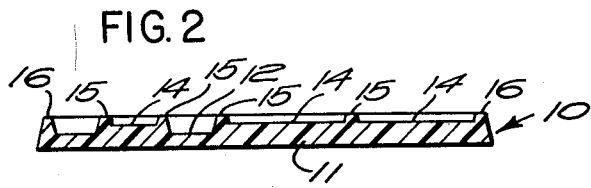
FIG. 3
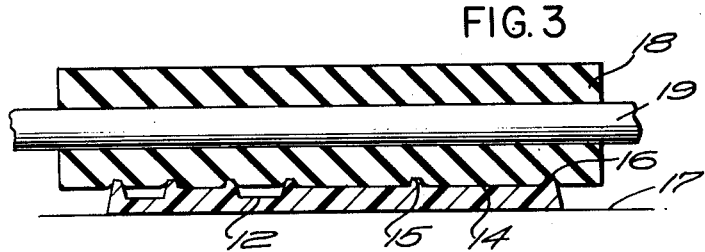
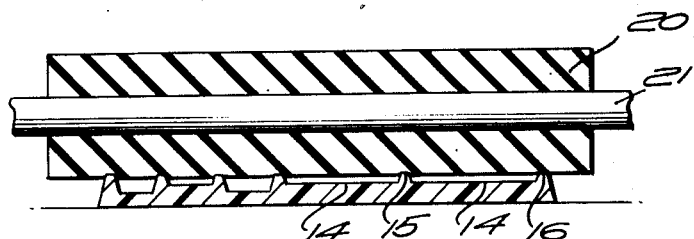
FIG. 4
*INVENTOR.*
Bertram M. Brown
BY
ATTORNEYS Patented July 14, 1953

2,645,049

UNITED STATES PATENT OFFICE 2,645,049

METHOD OF ORNAMENTING ARTICLES

Bertram M. Brown, Pawtucket, R. I., assignor to Rosbro Plastics Corporation, a corporation of Rhode Island Application January 27, 1951, Serial No. 208,193

2 Claims. (Cl. 41—24)

1

This invention relates to an ornamental member such, for instance, as a toy or figure, particularly one which may be formed of molded plastic material.

It is quite usual to use plastic figures for ornamenting a table or to use as a premium or prize with merchandising some other article such, for instance, as candy or the like, and in the use of these figures a contrast of color is desirable. Coloring of articles of this sort has heretofore been done by forming depressions in the article and then smearing the article with a pigment of a different color and wiping off part of the pigment, leaving the same in the depressions of the article. This is very expensive and a messy operation. In other cases articles of this character have been colored by masking the article and then spraying where it was desired to deposit color on the article. This is also exceedingly expensive, requiring a large amount of hand operation.

One of the objects of this invention is to provide an article which may be colored by much less expensive operations.

Another object of the invention is to provide an article which is so shaped as to well support the applicator of the color that very fine results may be obtained.

Another object of the invention is to provide a structure so that either fine striped lines, shading, or areas of substantial extent may be colored by a roller applying the color to the surfaces desired.

Another object of the invention is to provide a structure which may have more than one color contrast with a relatively lower portion of the body and thus provide a plurality of colors by a plurality of applications.

Another object of the invention is to adapt the surfaces of an article to be colored by molding so that a smooth surface roller may apply color to selected areas molded to receive it while omitting other areas and thus doing in the mold a large task heretofore done by more expensive procedure.

Another object of the invention is to provide a device which by reason of its construction and coloring will stand out more sharply than articles heretofore provided and will look larger than a similar article which lacks the contrasting outline.

Another object of this invention is to provide a method of procedure by which most any decorative effect may be duplicated.

With these and other objects in view, the invention consists of certain novel features of construction, as will be more fully described and particularly pointed out in the appended claims.

In the accompanying drawings:

2

Figure 1 is a plan view of an article which has been formed in accordance with this invention and which is mounted upon a pedestal;

Figure 2 is a section on line 2—2 of Figure 1 showing a plurality of surfaces raised different amounts from the rear surface of the figure;

Figure 3 is a sectional view similar to Figure 2 but showing a roll used for applying color to two of the surfaces raised above the body; and Figure 4 is a view similar to Figure 2 but showing a roll having a harder construction which will apply color to the surfaces which are raised the greatest amount but which will be out of contact with the surfaces which are raised a lesser amount from the body for applying a different color to the surfaces which are raised the greater amount.

In proceeding with this invention, I mold a plastic figure or member having a body with a substantially flat back and with portions raised different amounts, depending upon the color contrasts which I wish to provide and then to color the raised portions I apply the color by a roller, in the first instance I use a roller which will be sufficiently soft so as to apply the color to all of the surfaces raised above the body and then I will apply a different color to the surfaces which are raised a greater amount by another roller which will be of a harder construction so that it will not contact certain areas which were previously colored by the softer roller or the single soft roller may be used in the second instance with less pressure applied to it.

With reference to the drawings, 10 designates generally a figure or member which is mounted upon some base 11 so that it may be stood up on a horizontal surface. The figure or member 10 is most conveniently formed from some of the moldable plastics, and in the molding I so form the molding dies as to provide a main body portion 11 having a minimum thickness forming a normal surface 12 with raised areas 14, as shown in Figure 2, and with still greater raised areas in the form of stripes 15, as seen in Figure 2, within the perimeter of the figure and stripes 16 at the outer edge of the figure, these stripes 15 and 16 being raised the same amount from the base surface 12. The figure which I have illustrated is that of a cowboy and I have vertically shaded certain of the surfaces for red and horizontally shaded certain other of the surfaces for blue. Thus, if the figure is formed from a white plastic where there is no shading, I may have three contrasting colors—red, blue and white.

In order to quickly apply the different colors in a simple and inexpensive manner, the figure 10 is laid upon some surface 17, as shown in Figure 3, and a normally smooth surface cylindrical roller 18 upon some suitable shaft 19 has ink uniformly applied to it and is sufficiently soft so that when pressed upon the figure, the ink or color, which in this case will be blue, will be applied to all of the raised surfaces 14, 15, and 16, while the surface 12, which in this case is the unshaded tie of the figure, will be left white. In order, however, to apply another color, there will be another pass of a roller 20 on shaft 21 over the figure but this roller will be of much harder material and one which will not indent to such an extent as will the roller 18, under the same pressure, and with this roller which has had a color red uniformly applied to it, I will apply a red color which is shown in Figure 1 with the vertical shading and which will appear upon the surfaces 15 and 16 only being clear and not touching the surfaces 12 or 14. Thus, by passing two rolls of different indentible characteristics over the figure formed, as indicated above, with portions raised different amounts, I may apply two colors which will be different and which will contrast with the basic color of which the figure is formed. The rollers will have a durometer of from 10 to 70.

It will be apparent that in order to accomplish this method of applying two colors to the figure that a certain relationship must be had between the softness of the rollers and the difference in the raised stripes or surfaces which are to be colored. I have found that this may be accomplished by causing one surface to be raised .003 to .005 of an inch higher than another surface for each differential required. However, by changing the character of the roller, as above stated, the raising differential may, of course, be changed. Greater speed of operation may be performed by varying the differential .010 of an inch.

By this arrangement, color may be very quickly applied. I have further found that by providing a raised portion about the peripheral edge of the figure for the full extent of the figure that in applying the color by a roller of this character, there is no tendency for the figure to tip and cause a smearing which might occur if there is no outline around the edge of the figure such as shown at 16 in Figure 1. By this arrangement also a very sharp contrast may be had between areas of greater extent and the base or body of the figure and stars such as indicated at 22 may be brought out very sharply and shade lines otherwise very nicely provided.

I claim:

1. The method of forming an ornamental member which comprises providing the member with a plurality of distinct substantially parallel surface areas including an inner surface area and an outer surface area, each area located at a different distance from the outer surface area and then rolling a smooth resilient normally cylindrical surface to which color has been added over all surface areas by deforming the cylindrical surface to cause contact with the outer and at least one additional surface area and then rolling a smooth resilient normally cylindrical surface to which a different color has been added over all surface areas and deforming the last said cylindrical surface an amount to fail to contact with the surface area previously coated.

2. The method of claim 1 wherein the different surface areas are formed by molding.

BERTRAM M. BROWN.

References Cited in the file of this patent

UNITED STATES PATENTS

| Number | Name | Date |
|---|---|---|
| 1,446,241 | Armstrong | Feb. 20, 1923 |
| 1,797,552 | Henriksen | Mar. 24, 1931 |
| 1,863,816 | Von Webern | June 21, 1932 |
| 1,899,971 | Meehan | Mar. 7, 1933 |
| 1,914,247 | Froese | June 13, 1933 |
| 1,985,725 | Heisenberger | Dec. 25, 1934 |
| 2,033,162 | Von Webern | Mar. 10, 1936 |